United States Patent Office.

ABRAHAM RUDISILL AND MANROW SELL, OF SELL STATION, PENNSYLVANIA.

Letters Patent No. 111,876, dated February 14, 1871.

IMPROVEMENT IN HORSE AND CATTLE POWDERS.

The Schedule referred to in these Letters Patent and making part of the same.

*To all whom it may concern:*

Be it known that we, ABRAHAM RUDISILL and MANROW SELL, of Sell Station, in the county of Adams and in the State of Pennsylvania, have invented certain new and useful Improvements in Horse and Cattle Powder; and do hereby declare that the following is a full, clear, and exact description thereof.

Our powder is composed of the following ingredients, and in about the following proportions, namely:

Glauber salts, ground, one pound; resin, crushed, three ounces; sulphur, pulverized, half an ounce; fenugreek, pulverized, five drams; hard-wood ashes, sifted, half a pound; soot, crushed and sifted, five drams; antimony, five drams; saltpeter, ground, five drams. These ingredients are well and thoroughly mixed together.

We do not confine ourselves to the exact proportions above given, as they may be varied to suit circumstances.

Having thus described our invention,

What we claim as new, and desire to secure by Letters Patent, is—

A horse and cattle powder composed of Glauber salts, resin, sulphur, fenugreek, ashes, soot, antimony, and saltpeter, substantially as herein set forth.

In testimony that we claim the foregoing we have hereunto set our hands this 6th day of January, A. D. 1871.

ABRAHAM RUDISILL.
MANROW SELL.

Witnesses:
WILLIAM H. LOTT,
A. N. MARR.